US012786014B2

(12) United States Patent
Xu et al.

(10) Patent No.: US 12,786,014 B2
(45) Date of Patent: Nov. 3, 2026

(54) SIGNAL DETECTION METHOD AND DEVICE, AND STORAGE MEDIUM

(71) Applicant: ZTE CORPORATION, Shenzhen (CN)

(72) Inventors: Xiaojing Xu, Shenzhen (CN); Wei Lin, Shenzhen (CN); Zhicheng Xi, Shenzhen (CN); Hua Rui, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 159 days.

(21) Appl. No.: 18/900,734

(22) Filed: Sep. 28, 2024

(65) Prior Publication Data

US 2025/0023759 A1 Jan. 16, 2025

Related U.S. Application Data

(63) Continuation of application No. PCT/CN2023/102432, filed on Jun. 26, 2023.

(30) Foreign Application Priority Data

Jul. 15, 2022 (CN) ......................... 202210831551.7

(51) Int. Cl.
*H04L 25/02* (2006.01)

(52) U.S. Cl.
CPC ...... *H04L 25/0212* (2013.01); *H04L 25/0254* (2013.01)

(58) Field of Classification Search
CPC ......................... H04L 25/0212; H04L 25/0254
See application file for complete search history.

(56) References Cited

U.S. PATENT DOCUMENTS

2020/0059306 A1* 2/2020 Baek ...................... H04B 17/14
2020/0343985 A1 10/2020 O'Shea et al.

(Continued)

FOREIGN PATENT DOCUMENTS

CN 09067688 A * 12/2018
CN 109921882 A 6/2019

(Continued)

OTHER PUBLICATIONS

The Office Action of the corresponding CA application No. 3,247,028 dated Nov. 7, 2025.

(Continued)

*Primary Examiner* — Freshteh N Aghdam
(74) *Attorney, Agent, or Firm* — NZ Carr Law Office

(57) ABSTRACT

Disclosed in the present application are a signal detection method and device, and a storage medium. The signal detection method comprises: acquiring at least one group of historical signal samples, wherein the historical signal samples comprise historical channel estimation values, historical received signals and historical modulation signals; and when the current channel estimation value and a received signal to be subjected to detection have been acquired, inputting the current channel estimation value and said received signal into a pre-trained preset neural network for signal detection, so as to obtain a signal estimation value of said received signal, wherein the pre-trained preset neural network is obtained by training a preset neural network by means of the at least one group of historical signal samples.

19 Claims, 7 Drawing Sheets

(56) References Cited

U.S. PATENT DOCUMENTS

| | | | | |
|---|---|---|---|---|
| 2022/0240162 | A1* | 7/2022 | Liu | H04W 24/10 |
| 2023/0045011 | A1* | 2/2023 | Zheng | G06N 3/045 |
| 2023/0085924 | A1* | 3/2023 | Li | H04L 25/0224 370/252 |

FOREIGN PATENT DOCUMENTS

| | | | |
|---|---|---|---|
| CN | 111464465 | A | 7/2020 |
| CN | 109067688 | B | 9/2021 |
| CN | 113890799 | A | 1/2022 |
| EP | 1908241 | A2 | 4/2008 |
| WO | 2021181002 | A1 | 9/2021 |

OTHER PUBLICATIONS

EESR of the corresponding EP Patent Application No. 23838679.1 dated Jul. 3, 2025.

Chen Xiao et al: "Complex Deep Neural Network Based Intelligent Signal Detection Methods for OFDM-IM Systems", 2021 Joint European Conference on Networks and Communications & 6G Summit (EUCNC/6G Summit), IEEE, Jun. 8, 2021 (Jun. 8, 2021), pp. 90-94, XP033945869, DOI: 10.1109/EUCNC/6GSUMMIT51104.2021.9482564 [retrieved on Jul. 12, 2021] * the whole document *.

* cited by examiner

SIGNAL DETECTION METHOD AND DEVICE, AND STORAGE MEDIUM

CROSS-REFERENCE TO RELATED APPLICATIONS

The disclosure is a continuation of International Application No. PCT/CN2023/102432 filed on Jun. 26, 2023, which is based on the Chinese Patent Application No. 202210831551.7 filed on Jul. 15, 2022 and claims the priority to the Chinese Patent Application, which is incorporated herein in its entirety by reference.

TECHNICAL FIELD

The disclosure relates to the technical field of communication, in particular to a signal detection method, a signal detection device, a computer storage medium, and a computer program product.

BACKGROUND

Multiple in multiple out (MIMO) space division multiplexing technology and orthogonal frequency division multiplexing (OFDM) technology are extremely competitive in a radio communication system. By adopting the MIMO space division multiplexing technology, a spatial diversity gain and a channel capacity gain can be easily obtained by a system at a constant bandwidth and transmission bandwidth. The OFDM technology dramatically reduces the data rate of each channel and adds a time guard interval since it transmits data in parallel with multi-orthogonal subcarriers, and hence has a high capacity to resist multipath interference and frequency selective fading.

Signal detection, essential to an OFDM system and a MIMO system, primarily includes linear detection, nonlinear detection and optimal detection in the related art. They are available to implement signal detection but cannot satisfy the growing demand for signal detection due to their own advantages and disadvantages. For example, an optimal detection algorithm, such as a maximum likelihood detection algorithm, is highly complex since global search is required on all possible transmission symbol fields for a received signal. A linear detection algorithm, such as a zero-forcing algorithm and a minimum mean square error detection algorithm, is low in detection accuracy despite its low computational complexity. A nonlinear detection algorithm, such as a sphere decoding algorithm and a continuous interference cancellation algorithm, improves its detection accuracy by increasing the detection complexity.

SUMMARY

Examples of the disclosure provide a signal detection method, a signal detection device, a computer storage medium, and a computer program product, which can improve a performance of signal detection.

In a first aspect, an example of the disclosure provides a signal detection method. The signal detection method includes: obtaining at least one group of historical signal samples, where the historical signal sample includes a historical channel estimated value, a historical received signal and a historical modulated signal; and inputting, in a case that a current channel estimated value and a received signal to be detected are obtained, the current channel estimated value and the received signal to be inputted into a pre-trained preset neural network for signal detection, to obtain a signal estimated value of the received signal to be detected, where the pre-trained preset neural network is obtained by training a preset neural network by means of at least one group of the historical signal samples.

In a second aspect, the example of the disclosure further provides a signal detection device. The signal detection device includes: a memory, a processor and a computer program that is stored on the memory and executable on the processor, where the processor implements the signal detection method described above when executing the computer program.

In a third aspect, the example of the disclosure further provides a non-transitory computer-readable storage medium storing a computer-executable instruction, where the computer-executable instruction is configured to execute the signal detection method described above.

In a fourth aspect, the example of the disclosure further provides a computer program product. The computer program product includes a computer program or a computer instruction that is stored in a computer-readable storage medium, where a processor of a computer device reads the computer program or the computer instruction from the computer-readable storage medium, and the processor causes the computer device to execute the signal detection method described above by executing the computer program or the computer instruction.

In the example of the disclosure, based on the obtained historical signal samples that include the historical channel estimated value, the historical received signal and the historical modulated signal, the preset neural network is trained to obtain a neural network model that satisfies a requirement, such that the pre-trained neural network model is used to replace a detection model in the related art for signal detection. Since data and model dual-driven is adopted, that is, the channel estimated value and the received signal are simultaneously inputted into the preset neural network for training or detection, not only the preset neural network can more easily learn channel-related features, but also a performance of signal detection is improved. In addition, the amount of information needed for training or detection can be further significantly reduced, desirable environmental adaptability and generalization are achieved, an ever-growing demand for signal detection can be satisfied, and a technical gap in the related method can be made up.

DETAILED DESCRIPTION

Figure 1:
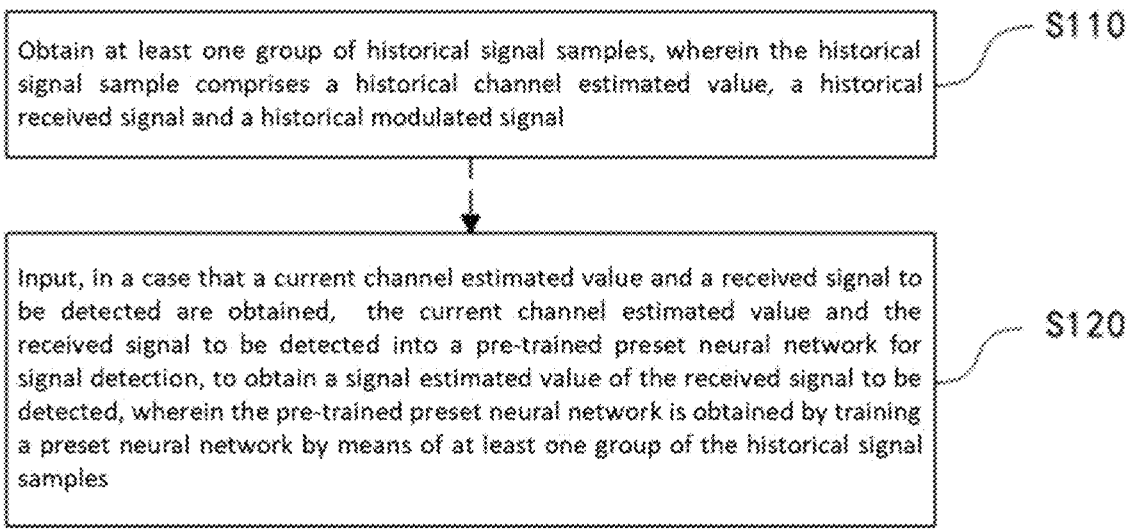
FIG. 1 is a flowchart of a signal detection method according to an example of the disclosure.

In order to make objectives, technical solutions, and advantages of the disclosure clearer, the disclosure will be further described below in detail with reference to accompanying drawings and examples. It should be understood that specific examples described herein are merely intended to explain the disclosure rather than limit the disclosure.

It should be noted that although a logical sequence is shown in the flowchart, in some cases, the steps shown or described can be executed in a sequence different from that in the flowchart. The terms "first", "second", etc. in the description, the claims and the accompanying drawings are used to distinguish similar objects, but are not necessarily used to describe a specific sequence or a sequential order.

In recent years, artificial intelligence (AI) technology, especially deep learning, has achieved great success in computer vision, natural language processing, speech recognition, etc. Intelligent radio communication enabled by AI technology is considered as one of the mainstream development directions of 6G in the future. A basic idea of the intelligent radio communication is to greatly improve a performance of radio communication system through organic integration of radio communication technology and the AI technology. Physical layer AI design includes two mainstream methods: end-to-end communication link design based on the AI technology, and communication module algorithm design based on the AI technology. At present, a design idea of the communication module algorithm based on the AI technology is mainly based on data driving, that is, one or several communication modules are regarded as an unknown black box and replaced by a deep learning network. The deep learning network is mainly obtained by training massive data, and hence has a heavy training burden, and is time-consuming and labor-intensive. In addition, application scenarios are simple and applicability is poor, and current demand for signal detection cannot be satisfied.

Based on that, the disclosure provides a signal detection method, a signal detection device, a computer storage medium, and a computer program product. The signal detection method according to an example includes: at least one group of historical signal samples is obtained. The historical signal sample includes a historical channel estimated value, a historical received signal and a historical modulated signal. In a case that a current channel estimated value and a received signal to be detected are obtained, a signal estimated value of the received signal to be detected is obtained by inputting the current channel estimated value and the received signal to be detected into a pre-trained preset neural network for signal detection. The pre-trained preset neural network is obtained by training a preset neural network with the at least one group of historical signal samples. In this example, based on the historical signal samples obtained that include the historical channel estimated value, the historical received signal and the historical modulated signal, and a neural network model that satisfies a requirement is obtained by training the preset neural network, such that the pre-trained neural network model is used to replace a detection model in the related art for signal detection. Since data and model dual-driven is adopted, that is, the channel estimated value and the received signal are simultaneously inputted into the preset neural network for training or detection, the preset neural network can more easily learn channel-related features, and a performance of signal detection is improved. In addition, an amount of information needed for training or detection can be further significantly reduced, desirable environmental adaptability and generalization are achieved, an ever-growing demand for signal detection can be satisfied, and a technical gap in the related method can be made up.

The example of the disclosure will be further expounded below with reference to the accompanying drawings:

As shown in FIG. 1, FIG. 1 is a flowchart of a signal detection method according to an example of the disclosure. The signal detection method may include, but is not limited to, S110-S120.

In S110: at least one group of historical signal samples is obtained. The historical signal sample includes a historical channel estimated value, a historical received signal and a historical modulated signal.

In S120: in a case that a current channel estimated value and a received signal to be detected are obtained, the current channel estimated value and the received signal to be detected are inputted into a pre-trained preset neural network for signal detection, to obtain a signal estimated value of the received signal to be detected. the pre-trained preset neural network is obtained by training a preset neural network by means of at least one group of the historical signal samples.

In these steps, based on the obtained historical signal samples that include the historical channel estimated value, the historical received signal and the historical modulated signal, the preset neural network is trained to obtain a neural network model that satisfies a requirement, such that the pre-trained neural network model is used to replace a detection model in the related art for signal detection. Since data and model dual-driven is adopted, that is, the channel estimated value and the received signal are simultaneously inputted into the preset neural network for training or detection, not only the preset neural network can more easily learn channel-related features, but also a performance of signal detection is improved. In addition, the amount of information needed for training or detection can be further significantly reduced, desirable environmental adaptability and generalization are achieved, an ever-growing demand for signal detection can be satisfied, and a technical gap in the related method can be made up.

It can be seen that compared with the data-driven deep learning network in the related art, the example of the disclosure is based on the data and model dual-driven, that is, based on the prior art of the radio communication system, a structure of the radio communication system is not changed, and the deep learning network is used to replace the relevant detection module, so as to improve a performance of model. Compared with the data-drive-based deep learning network that mainly relies on massive data, the deep learning network based on the data and model dual-driven in the example of the disclosure merely needs to rely on a communication model or an algorithm model. Based on an existing model of a physical layer, an amount of information needed for training, upgrading or detection can be significantly reduced, and desirable environmental adaptability and generalization, and broad development prospects are achieved.

In an example, the example of the disclosure can be, but is not limited to, applied to orthogonal frequency division multiplexing (OFDM) technology or multiple in multiple out (MIMO) technology, for example, to an OFDM receiver in the MIMO technology. That is, the preset neural network in the example of the disclosure may be integrated into the OFDM receiver, the preset neural network may be trained in the OFDM receiver, and after relevant information is received, a signal is detected based on the pre-trained preset neural network, for which a basic principle is consistent with that of the example of the disclosure, and is not repeated herein. Understandably, those skilled in the art mayfurther select a method for applying the signal detection method of the example of the disclosure according to a specific application scenario, which is not limited herein. For example, the condition that a plurality of application scenarios to which the signal detection method of the example of the disclosure may be applied are derived with further development of the network system is not excluded.

In an example, the preset neural network may include, but is not limited to, at least one of the following:

- a deep neural network;
- a convolutional neural network;
- a residual convolutional neural network; and
- a residual convolutional neural network with an attention mechanism.

The instances of the preset neural network provided above may be offline trained and online deployed, or online deployed after being offline trained uniformly, or online trained and deployed uniformly, which is not limited herein. In addition to the instances of the preset neural networks provided above, those skilled in the art can further consider setting an appropriate preset neural network according to a feature, a demand, etc. of a specific application scenario, which will not be repeated herein.

In an example, the historical channel estimated value and the historical received signal are distinguished from the current channel estimated value and the received signal to be detected. That is, the historical channel estimated value and the historical received signal are used to train the preset neural network, and the current channel estimated value and the received signal to be detected are signal parameters to be detected by the preset neural network. However, as a training process continues, the current channel estimated value and the received signal to be detected may also become a new historical channel estimated value and historical received signal respectively. That is, training of the preset neural network may be dynamic and has time migration, such that more signal samples can be used to train the preset neural network to achieve a better training effect. A training process of the preset neural network will be described in detail step by step in an example below.

In an example, after the pre-trained preset neural network is obtained by training the preset neural network by means of the at least one group of historical signal samples, the historical channel estimated value and the historical received signal may be inputted into the preset neural network as a group of detection data for re-detection. An actual training effect of the preset neural network may be determined according to a detection result, and whether an error is likely to occur during the entire training process of the preset neural network is further determined advantageously.

In an example, the historical channel estimated value, the historical received signal, the current channel estimated value and the received signal to be detected can be obtained by sequentially transmitting a group of signals, or can be obtained by transmitting respective corresponding signals, which is not limited herein.

In an example, a specific number of the historical signal samples can be set according to a specific application scenario. That is, the training sample of the preset neural network may be set according to the specific application scenario, which is not limited herein.

Figure 2:
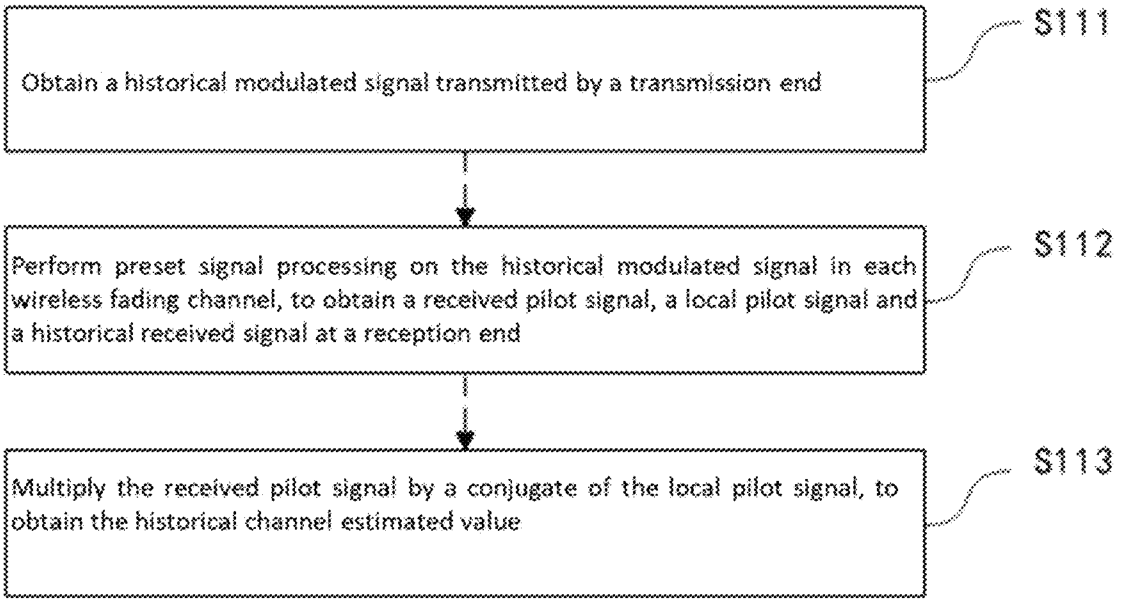
FIG. 2 is a flowchart of obtaining at least one group of historical signal samples in a signal detection method according to an example of the disclosure.

As shown in FIG. 2, in an example of the disclosure, when a plurality of groups of historical signal samples are provided, and each wireless fading channel corresponds to the plurality of groups of historical signal samples, S110 may include, but is not limited to, S111 to S113.

In S111: a historical modulated signal transmitted by a transmission end is obtained.

In S112: preset signal processing is performed on the historical modulated signal in each wireless fading channel, to obtain a received pilot signal, a local pilot signal and a historical received signal at a reception end.

In S113: the received pilot signal is multiplied by a conjugate of the local pilot signal, to obtain the historical channel estimated value.

In these steps, since the plurality of groups of historical signal samples are provided, and each wireless fading channel corresponds to the plurality of groups of historical signal samples, the historical modulated signal transmitted by the transmission end is obtained, preset signal processing is performed on the historical modulated signal in each wireless fading channel, and thus the received pilot signal, the local pilot signal and the historical received signal can be obtained at the reception end. Further, the historical channel estimated value is obtained by multiplying the received pilot signal and the conjugate of the local pilot signal together. That is, since the amplitude of the received signal changes randomly due to channel change, at least one group of complete and different historical signal samples can be obtained correspondingly for each wireless fading channel, such that a plurality of historical signal samples can be generated for training the preset neural network in total, and the training effect can be guaranteed to a great extent.

In an example, the transmission end and the reception end are a group of relative concepts, that is, the transmission end corresponds to an initial source of the signal and the reception end corresponds to a back-end result of the signal, which does not limit specific presentation forms of the transmission end and the reception end but is configured to clearly explain a work principle of the example of the disclosure. A specific transmission end and the reception end may be arranged in the specific application scenario, but are not limited herein.

In an example, the historical modulated signal transmitted by the transmission end may be obtained in a plurality of manners, which are limited herein. For example, at least one group of transmission bit stream signals transmitted by the transmission end may be obtained, and the historical modulated signal may be obtained by encoding and modulating the at least one group of transmission bit stream signals. That is, the historical modulated signal may be obtained by preprocessing the initial transmission bit stream signals. Alternatively, a signal to be processed may be adjusted to the historical modulated signal in advance by the transmission end, such that the historical modulated signal can be directly obtained from the transmission end.

In an example, the historical channel estimated value may be obtained by multiplying the received pilot signal and the conjugate of the local pilot signal together in a plurality of manners, which are not limited herein. For example, the historical channel estimated value may be obtained by multiplying the received pilot signal and the conjugate of the local pilot signal together through, but not limited to a least squares (LS) channel estimation algorithm or other traditional communication algorithms that are common in the field. The least squares method is a mathematical model that is applied in data processing fields such as error estimation, uncertainty, system identification and prediction, which is well known to those skilled in the art and will not be repeated herein.

In an example, the preset signal processing may be performed on the historical modulated signal in a plurality of manners, which are not limited herein. For example, a first output signal may be obtained by performing fast Fourier transform on and adding a cyclic prefix to the historical modulated signal. Then different second output signals may be obtained by transmitting the first output signal through different wireless fading channels, then the signal is restored through cyclic prefix deletion and inverse Fourier transform on the second output signal, and the received pilot signal, the local pilot signal and the historical received signal may be finally obtained. In another example, the historical modulated signal may be inputted into a preset network model, and the historical modulated signal may be demodulated and equalized through the preset network model, and the received pilot signal, the local pilot signal and the historical received signal may be finally obtained.

Figure 3:
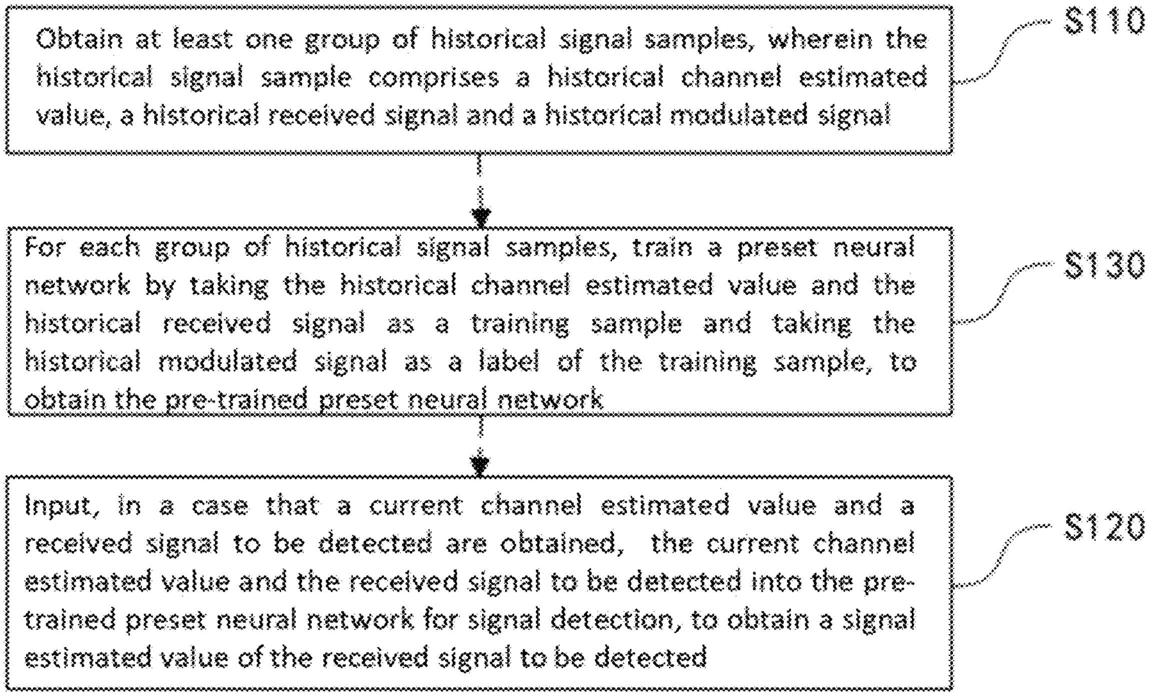
FIG. 3 is a flowchart of a signal detection method before a current channel estimated value and a received signal to be detected are inputted into a pre-trained preset neural network for signal detection according to an example of the disclosure.

As shown in FIG. 3, in an example of the disclosure, when a plurality of groups of historical signal samples are provided, the signal detection method further includes, but is not limited to, S130 before S120.

In S130: for each group of historical signal samples, the preset neural network is trained by taking the historical channel estimated value and the historical received signal as a training sample and taking the historical modulated signal as a label of the training sample, to obtain the pre-trained preset neural network.

In this step, the historical channel estimated value and the historical received signal are used as the training sample, such that the preset neural network more easily learns features of different wireless fading channels during training, and a better training effect is achieved. In addition, a complete training process can be implemented without using other training samples, thus, parameters required for training can be reduced and time required for training can be shortened. In addition, the historical modulated signal that is associated with the historical channel estimated value and the historical received signal is used as the label of the training sample, such that the training stability of the preset neural network can be improved.

The working principles of the examples described above will be described below with a specific instance below.

Instance I:

At first, it is necessary to determine the preset neural network. By assuming that in the MIMO system that has N reception antennas, the received signal is denoted by Y, $Y_{Data}$ denotes the historical received signal, $Y_{Pilot}$ denotes the received pilot signal, and the local pilot signal is denoted by $X_{Pilot}$. At first, the channel estimated value is computed with $X_{Pilot}$ and $Y_{Pilot}$, and the LS channel estimated value $\hat{H}_{LS}$ is obtained by the following formula (1):

$$\hat{H}_{LS} = Y_{Pilot} / X_{Pilot} \tag{1}$$

Then, the LS channel estimated value $\hat{H}_{LS}$ and $Y_{Data}$ are inputted into the preset neural network together for training, and a final transmitted data estimated value $\hat{X}_{Data}$ is obtained.

Figure 4:
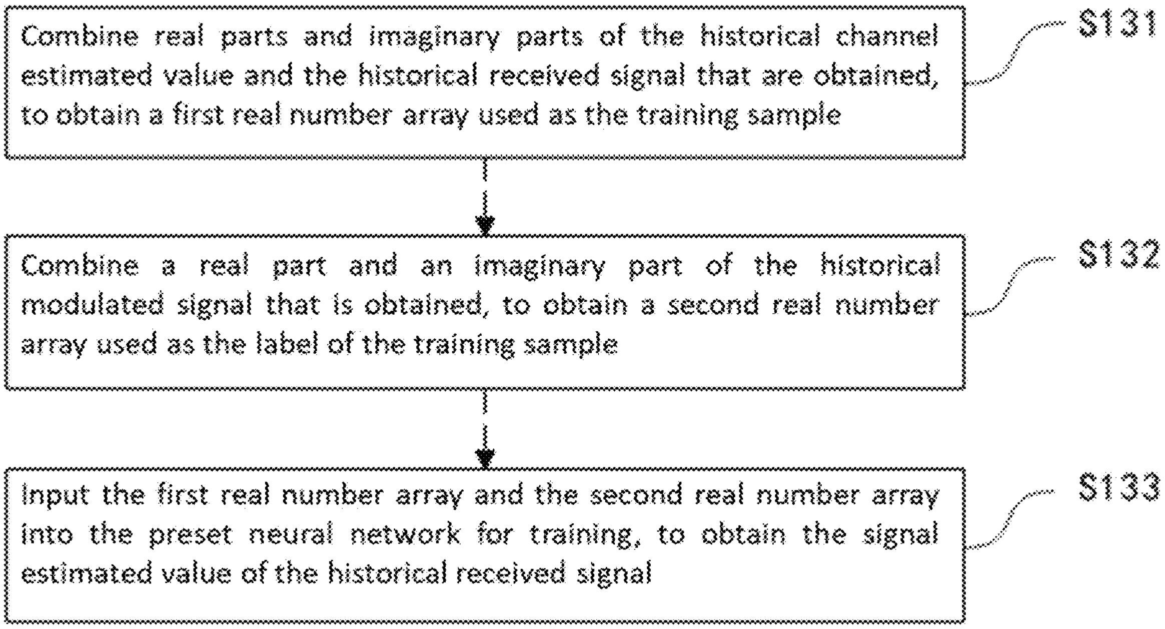
FIG. 4 is a flowchart of obtaining a pre-trained preset neural network by training a preset neural network in a signal detection method according to an example of the disclosure.

As shown in FIG. 4, in an example of the disclosure, S130 is further described, and S130 may include, but is not limited to, S131 to S133.

In S131: real parts and imaginary parts of the historical channel estimated value and the historical received signal that are obtained are combined, to obtain a first real number array used as a training sample.

In S132: a real part and an imaginary part of the historical modulated signal that is obtained are combined, to obtain a second real number array used as a label of the training sample.

In S133: the first real number array and the second real number array are inputted into the preset neural network for training, to obtain the signal estimated value of the historical received signal.

In these steps, the first real number array is obtained as the training sample by combining the real parts and the imaginary parts of the historical channel estimated value and the historical received signal that are obtained. The second real number array is obtained as the label of the training sample by combining the real part and the imaginary part of the historical modulated signal that is obtained. That is, inputting forms of the historical channel estimated value, the historical received signal and the historical modulated signal are uniformly set in a format satisfying an input requirement of the preset neural network, so that the signal estimated value of the historical received signal is obtained by training, according to the real number array, the preset neural network. In addition, in a specific application scenario, corresponding values of the real part and the imaginary part may denote a value of an antenna port and a value of the reception antenna respectively, that is, a format of the real number array may better adapt to an operation of the neural network.

In an example, the preset neural networks of other types may be provided besides the real number neural network. Accordingly, input into the preset neural network may change along with a change in the type of the preset neural network. That is, S131 to S133 in the example described above does not limit a content input into the preset neural network, and an appropriate training input content may be selected according to a specific scenario, which is not limited herein.

Figure 5:
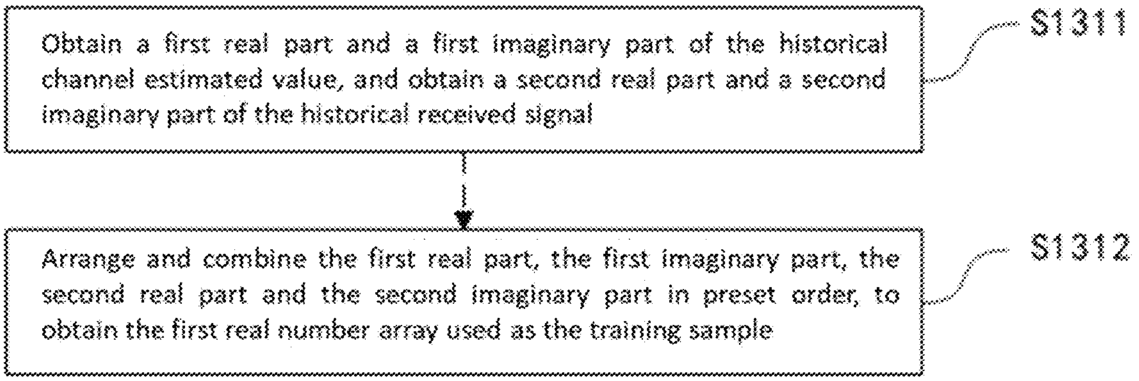
FIG. 5 is a flowchart of obtaining a first real number array as a training sample in a signal detection method according to an example of the disclosure.

As shown in FIG. 5, in an example of the disclosure, S131 is further described, and S131 may include, but is not limited to, S1311 to S1312.

In S1311: a first real part and a first imaginary part of a historical channel estimated value are obtained, and a second real part and a second imaginary part of a historical received signal are obtained.

In S1312: the first real part, the first imaginary part, the second real part and the second imaginary part are arranged and combined in preset order, to obtain the first real number array used as the training sample.

In these steps, the first real part and the first imaginary part of the historical channel estimated value are obtained, and the second real part and the second imaginary part of a historical received signal are obtained. Then real number sets corresponding to the historical channel estimated value and the historical received signal may be generated respectively, and the first real number array including the historical channel estimated value and the historical received signal may be obtained by arranging and combining, in the preset order, the first real part, the first imaginary part, the second real part and the second imaginary part of the real number sets.

In an example, the preset order for an arrangement is not limited, and may be, but is not limited to, arrangement according to the real parts and the imaginary parts that correspond to the historical channel estimated value and the historical received signal respectively. That is, the real part and imaginary part of the historical channel estimated value are arranged in adjacent positions, and the real part and imaginary part of the historical received signal are arranged in adjacent positions. Alternatively, arrangement may be implemented sequentially according to the specific application scenario.

Figure 6:
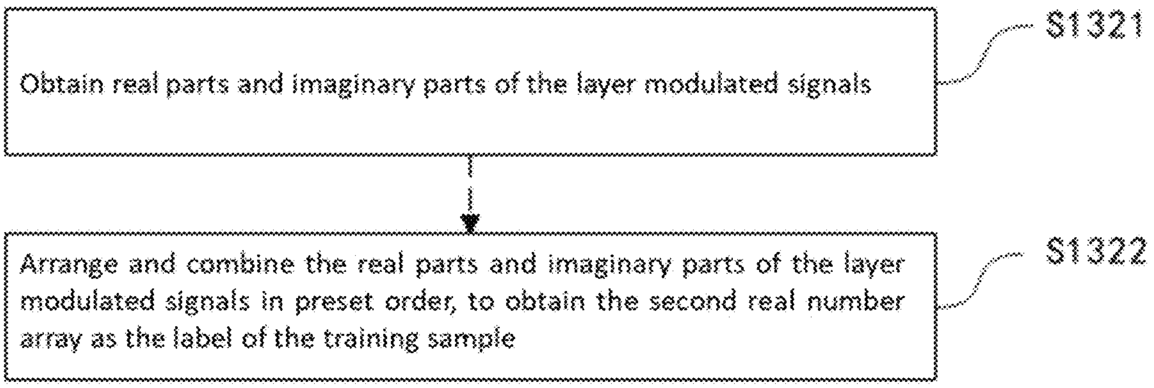
FIG. 6 is a flowchart of obtaining a second real number array as a label of a training sample in a signal detection method according to an example of the disclosure.

As shown in FIG. 6, in an example of the disclosure, in a case that the historical modulated signal includes a modulated signal stream, and the modulated signal stream includes a plurality of layer modulated signals, S132 is further described, and S132 may include, but is not limited to, S1321 to S1322.

In S1321: real parts and imaginary parts of layer modulated signals are obtained.

In S1322: the real parts and imaginary parts of the layer modulated signals are arranged and combined in preset order, to obtain the second real number array as the label of the training sample.

In these steps, in a case that the historical modulated signal includes the modulated signal stream, and the modulated signal stream includes layer modulated signals, it indicates that the historical modulated signal in this case is equivalent to a signal layer. By obtaining the real parts and the imaginary parts of the layer modulated signals, the entire real part and imaginary part of the historical modulated signal are obtained equivalently, and then the second real number array as the label of the training sample may be obtained by arranging and combining, in the preset order, the real parts and the imaginary parts of the layer modulated signals.

In an example, the preset order for an arrangement is not limited, and may be, but is not limited to, arrangement according to the real parts and the imaginary parts of the layer modulated layers. That is, the real part and imaginary part of each layer modulated layers are arranged in adjacent positions, and real parts and imaginary parts of adjacent layer modulated layers are arranged in adjacent positions. Alternatively, the sequential arrangement may be implemented according to the specific application scenario.

Figure 7:
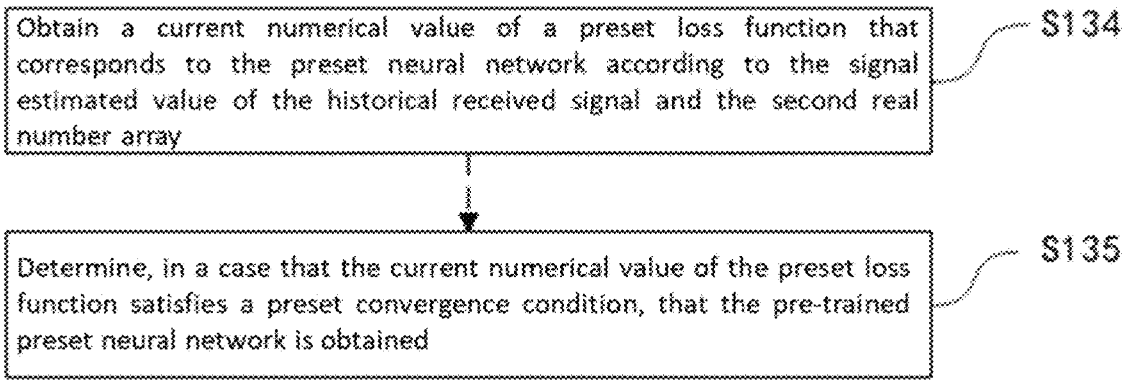
FIG. 7 is a flowchart of a signal detection method after a signal estimated value of a historical received signal is obtained according to an example of the disclosure.

As shown in FIG. 7, in an example of the disclosure, the signal detection method further includes, but is not limited to, S134 to S135 after S133. S134 to S135 are configured to determine that the pre-trained preset neural network is obtained.

In S134: a current numerical value of a preset loss function that corresponds to a preset neural network is obtained according to a signal estimated value of a historical received signal, and a second real number array.

In S135: in a case that the current numerical value of the preset loss function satisfies a preset convergence condition, it is determined that a pre-trained preset neural network is obtained.

In these steps, the loss function is computed through the trained signal estimated value and the predetermined second real number array, and whether a computed numerical value satisfies the preset convergence condition is determined. Then in a case that the computed numerical value does not satisfy the preset convergence condition, a new signal estimated value is obtained by further training and optimizing the preset neural network. By analogy, then a new loss function value is computed with the new signal estimated value and determination is re-performed. Hence, the preset neural network can be continuously optimized, and the signal estimated value that is finally trained and obtained continuously approaches a transmitted signal. In addition, since data bit sources with different lengths and different modulation modes can be flexibly supported, an application to a related scenario where the loss function is computed can be more reliably implemented, and finally the preset neural network that satisfies the requirement can be trained.

In an example, the preset loss function includes at least one of the following:

a mean square error (MSE) loss function;
a root mean squared error (RMSE) loss function;
a mean absolute error (MAE) loss function;
an Euclidean distance loss function;
a cosine distance loss function; and
a linear weighting function of a MSE loss function, a RMSE loss function, a MAE loss function, a Euclidean distance loss function and a cosine distance loss function.

The loss function described above is well known to those skilled in the art, and will not be repeated herein. Alternatively, those skilled in the art can also set a corresponding preset loss function for the preset neural network according to the specific application scenario, which is not limited herein.

The working principles of the examples described above will be described below with a specific instance below.

Instance II:

At first, a training input into the preset neural network is constructed based on the MIMO system. The preset neural network is a real number neural network, and thus it is necessary to separate a real part from an imaginary part of $\hat{H}_{LS}$ and $Y_{Data}$ to form a group of real number arrays, for example, $[Re(\hat{H}_{LS}), Im(\hat{H}_{LS}), Re(Y_{Data}), Im(Y_{Data})]$, where Re(•) and Im(•) denote operations of selecting the real part and imaginary part respectively. Since in the MIMO system, $\hat{H}_{LS}$ has values on P antenna ports and R reception antennas, and $Y_{Data}$ has values on R reception antennas, the real number array obtained above also includes the values of the real part and the imaginary parts on the P antenna ports and the R reception antennas, and this real number array is used as the training input into the preset neural network.

Figure 12:
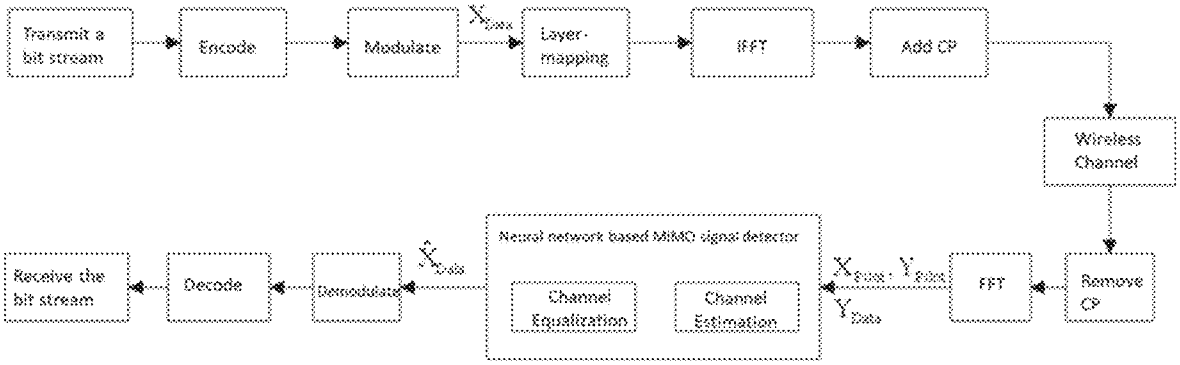
FIG. 12 is an execution flowchart of a signal detection method according to an example of the disclosure.

Then, labels of the training samples of the preset neural network are further generated and the model training is performed. With reference to FIG. 12, a transmission modulated signal $X_{Data}$ (that is, the historical modulated signal) including multi-layer MIMO signals is generated by encoding and modulating the transmission bit stream transmitted by the transmission end. After passing through the wireless fading channel, the neural network (that is, the pre-trained preset neural network, the same below and no more detailed description) based MIMO signal detector obtains the received pilot signal $Y_{Pilot}$, the received signal $Y_{Data}$ and the local pilot signal $X_{Pilot}$. According to an operation similar to the previous step, a real number array [Re($\hat{H}_{LS}$), Im($\hat{H}_{LS}$), Re($Y_{Data}$), Im($Y_{Data}$)] may be obtained and used as the training sample. In addition, the transmitted modulated signals $X_{Data}$ are also arranged in order according to the real part and imaginary part to form a one-dimensional real number array, as shown below:

$$X'_{Data} = \left[X_{Data,0}^{Real}, X_{Data,0}^{Imag}, \ldots , X_{Data,i}^{Real}, X_{Data,i}^{Imag}, \ldots , X_{Data,K}^{Real}, X_{Data,K}^{Imag}\right]$$

Where, $K=T \cdot L_{layer}$, $L_{layer}$ denotes the number of layers of MIMO signal, and T denotes the number of resource elements (REs) occupied by the modulated signals of each layer, and this one-dimensional real number array $X'_{Data}$ is used as the label of the training sample. It can be seen that for the multi-layer MIMO signals, it is not necessary to pay attention to specific lengths or modulation manners since these signals are uniformly arranged by the method above. That is, this instance may flexibly support data bitstreams that have different lengths and different modulation manners. By analogy, in different wireless fading channels, a plurality of groups of training samples and labels are generated, each group of training samples and labels is set to be in the same arrangement order as the label data, and is inputted into the preset neural network for training, and an estimated value $\hat{X}_{Data}$ of the transmitted signal is obtained. Then the loss function is computed with both the estimated value of the transmitted signal and the label $X'_{Data}$, and network training may be determined to be completed after the loss function converges to a certain degree.

Figure 8:
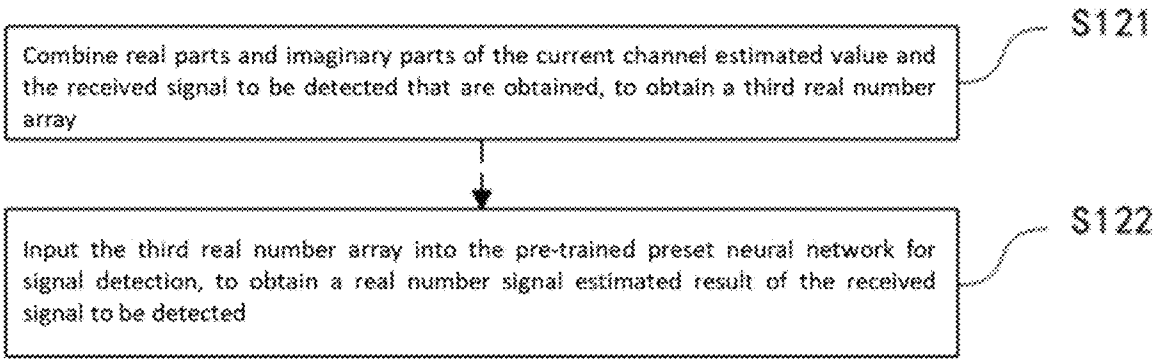
FIG. 8 is a flowchart of obtaining a signal estimated value of a received signal to be detected in a signal detection method according to an example of the disclosure.

As shown in FIG. 8, in an example of the disclosure, S120 is further described, and S120 may include, but is not limited to, S121 to S122.

In S121: real parts and imaginary parts of the current channel estimated value and the received signal to be detected that are obtained are combined, to obtain a third real number array.

In S122: the third real number array is inputted into the pre-trained preset neural network for signal detection, to obtain a real number signal estimated result of the received signal to be detected.

In these steps, the third real number array is obtained by combining the real parts and the imaginary parts of the current channel estimated value and the received signal to be detected that are obtained. Hence corresponding input parameters that satisfy requirements are provided for the preset neural network, that is, input formats of the current channel estimated value and the received signal to be detected are uniformly set in a format that satisfies the input requirement for the preset neural network. Thus, the estimated result of the real number signal of the received signal to be detected is obtained through detection by the preset neural network according to the real number array.

In an example, an output by the preset neural network may be in other types besides the output estimated result of the real number signal. Accordingly, the input into the preset neural network may change along with a change in an output type of the preset neural network, which is not limited herein.

Figure 9:
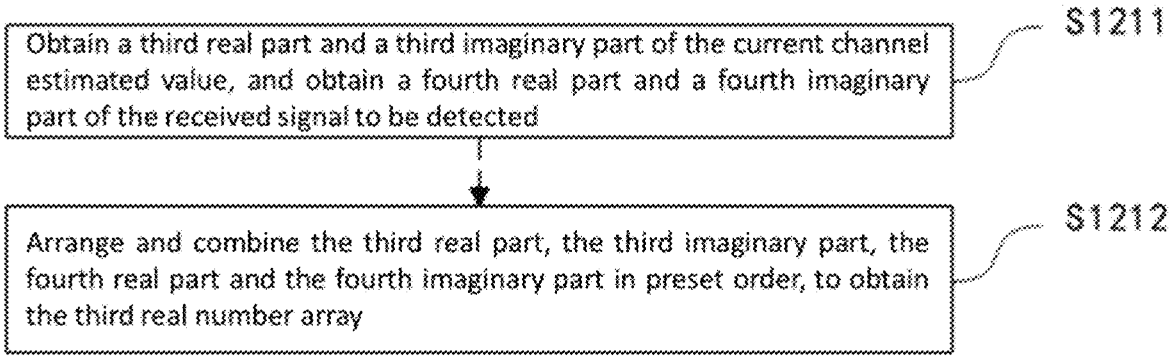
FIG. 9 is a flowchart of obtaining a third real number array in a signal detection method according to another example of the disclosure.

As shown in FIG. 9, in an example of the disclosure, S121 is further described, and S121 may include, but is not limited to, S1211 to S1212.

In S1211: a third real part and a third imaginary part of a current channel estimated value are obtained, and a fourth real part and a fourth imaginary part of a received signal to be detected are obtained.

In S1212: the third real part, the third imaginary part, the fourth real part and the fourth imaginary part in preset order are arranged and combined, to obtain the third real number array.

In these steps, the third real part and the third imaginary part of the current channel estimated value are obtained, and the fourth real part and the fourth imaginary part of the received signal to be detected are obtained. Then real number sets corresponding to the current channel estimated value and the received signal to be detected may be generated respectively, and the third real number array including the current channel estimated value and the received signal to be detected may be obtained by arranging and combining, in the preset order, the third real part, the third imaginary part, the fourth real part and the fourth imaginary part of the real number sets.

In an example, the preset order for an arrangement is not limited, and may be, but is not limited to, an arrangement according to the real parts and the imaginary parts that correspond to the current channel estimated value and the received signal to be detected respectively. That is, the real part and imaginary part of the current channel estimated value are arranged in adjacent positions, and the real part and imaginary part of the received signal to be detected are arranged in adjacent positions. Alternatively, the sequential arrangement may be implemented according to the specific application scenario.

Figure 10:
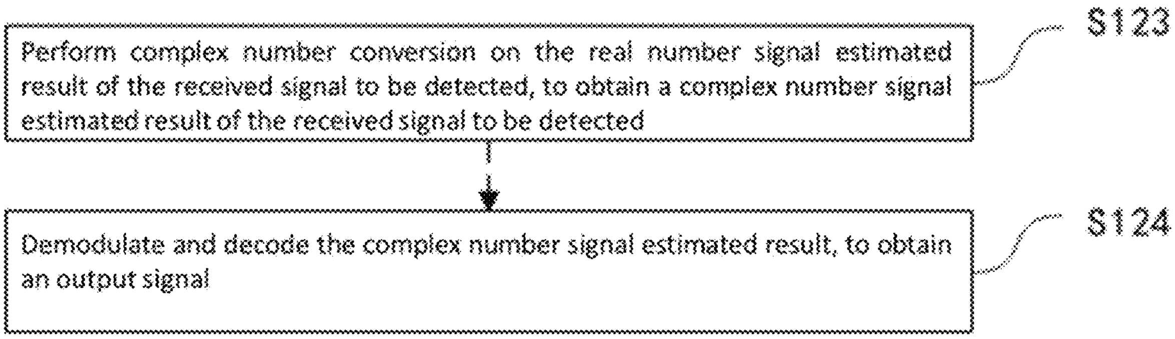
FIG. 10 is a flowchart of a signal detection method after a real number signal estimated result of a received signal to be detected is obtained according to an example of the disclosure.

As shown in FIG. 10, in an example of the disclosure, an example of steps after S122 are further described, and the signal detection method may include, but is not limited to, S123 to S124 after S122.

In S123: complex number conversion is performed on a real number signal estimated result of the received signal to be detected, to obtain a complex number signal estimated result of the received signal to be detected.

In S124: the complex number signal estimated result is demodulated and decoded, to obtain an output signal.

The complex number signal estimated result of the received signal to be detected is obtained from the real number signal estimated result of the received signal to be detected. Then, the complex number signal estimated result can be further demodulated and decoded, to obtain the final output signal.

Figure 11:
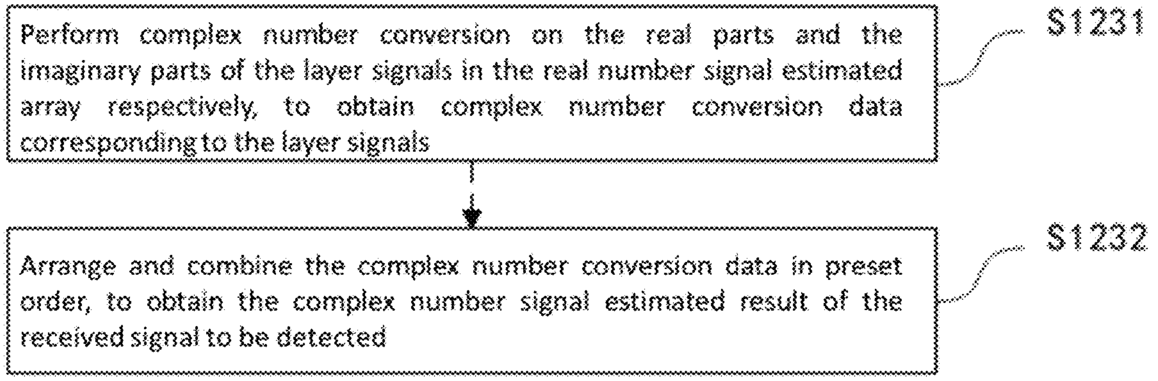
FIG. 11 is a flowchart of obtaining a complex number signal estimated result of a received signal to be detected in a signal detection method according to an example of the disclosure.

As shown in FIG. 11, in an example of the disclosure, in a case that the real number signal estimated result includes a real number signal estimated array, and the real number signal estimated array includes real parts and imaginary parts of a plurality of layer signals that are arranged in order, S123 is further described, and S123 may include, but is not limited to, S1231 to S1232.

In S1231: complex number conversion is performed on the real parts and the imaginary parts of the layer signals in the real number signal estimated array respectively, to obtain complex number conversion data corresponding to the layer signals g.

In S1232: the complex number conversion data are arranged and combined in preset order, to obtain the complex number signal estimated result of the received signal to be detected.

In these steps, since the real number signal estimated result includes the real number signal estimated array, and the real number signal estimated array includes the real parts and the imaginary parts of the plurality of layer signals that are arranged in order, the complex number conversion data corresponding to each layer signals are obtained by performing complex number conversion on the real parts and the imaginary parts of the layer signals in the real number signal estimated array. Then, the complex number signal estimated result of the received signal to be detected can be accurately obtained reliably by arranging and combining the complex number conversion data.

The working principles of the examples described above will be described below with a specific instance below.

Instance III:

As shown in FIG. 12, online signal detection is implemented by using the preset neural network. After training, the preset neural network may be deployed at the reception end of the MIMO system for online signal detection. When the online signal detection is performed, the input parameters of the preset neural network may be obtained in a similar way as in Instance I and Instance II, and then the preset neural network is used for online detection to obtain an output of the preset neural network, that is, the estimated value of the transmitted signal. Then conversion from the real number array to equalized complex number value data is completed, and is shown in an operation below:

$$\hat{X}_{Data} = [X_{Data,0}^{Real}, X_{Data,0}^{Imag}, \ldots, X_{Data,i}^{Real}, X_{Data,i}^{Imag}, \ldots, X_{Data,K}^{Real}, X_{Data,K}^{Imag}] \rightarrow \hat{X}_{Data}^{sym} = [\text{complex}(X_{Data,0}^{Real}, X_{Data,0}^{Imag}), \ldots, \text{complex}(X_{Data,i}^{Real}, X_{Data,i}^{Imag}), \ldots, \text{complex}(X_{Data,K}^{Real}, X_{Data,K}^{Imag})]$$

Where, complex(•) denotes the operation of constituting one piece of complex number value data, and the complex number value data $$\hat{X}_{Data}^{sym}$$

converted are used for subsequent demodulation and decoding, so as to obtain the final output signal.

The working principles of the examples described above will be described below with an entire flow instance below.

Figure 13:
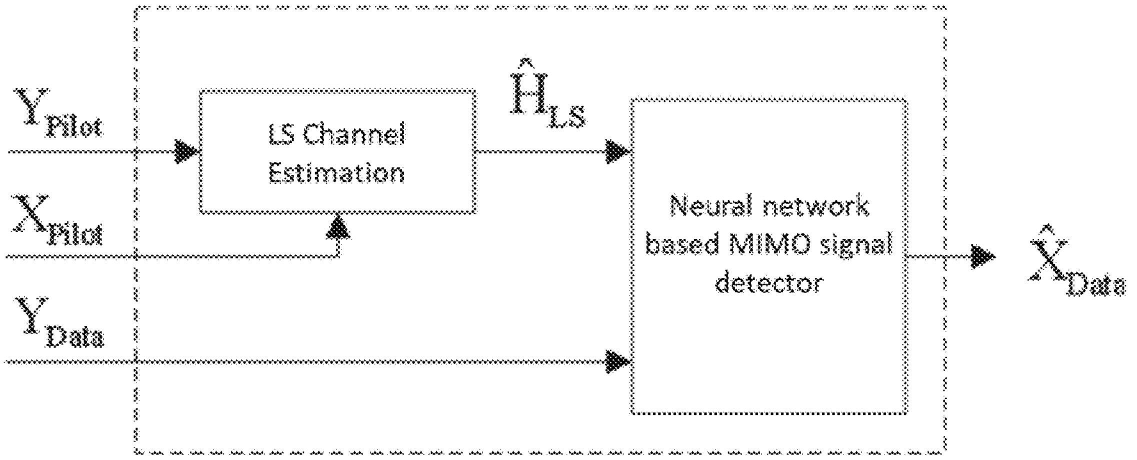
FIG. 13 is a schematic diagram of a principle of a multiple in multiple out (MIMO) system based on a preset neural network according to an example of the disclosure.

Instance IV:

As shown in FIG. 13, in an OFDM system in the MIMO technology, a neural network (that is, the preset neural network in the example of the disclosure) based MIMO signal detector and an LS channel estimation module are provided. In this case, L=2 data layers, P=2 antenna ports, T=2 physical transmitting antennas, and R=2 physical reception antennas are provided. A frequency domain signal Y at the reception end may be expressed as formula (2):

$$Y = HX + N \rightarrow \begin{bmatrix} y_1 \\ y_2 \end{bmatrix} = \begin{bmatrix} h_{11} & h_{12} \\ h_{21} & h_{22} \end{bmatrix} \cdot \begin{bmatrix} x_1 \\ x_2 \end{bmatrix} + \begin{bmatrix} n_1 \\ n_2 \end{bmatrix} \quad (2)$$

Where, X denotes a transmitted signal after modulation of these two data layers, and the dimension is L×1, that is, 2×1; H denotes a radio channel matrix between the transmission end and the reception end, and the dimension is T×R, that is, 2×2; and N denotes additive white Gaussian noise, and the dimension is R×1, that is, 2×1. The dimensions of the frequency domain received signal $Y_{Data}$ and the received pilot signal $Y_{Pilot}$ are also R×1, that is, 2×1, and the dimension of the local pilot signal $X_{Pilot}$ at the reception end is P×1, that is, 2×1. Assuming that the frequency domain received signal and the received pilot signal occupy two OFDM symbols, the received pilot signal occupies the first OFDM symbol and the frequency domain received signal occupies the second OFDM symbol.

The MIMO signal detection method based on the neural network proposed in this instance focuses on how to detect the transmitted signal X from the frequency domain signal Y at the reception end. The specific steps are as follows:

Step 1: the structure of the neural network based MIMO signal detector is determined. At first, $X_{Pilot}$ and $Y_{Pilot}$ are inputted into an LS channel estimation sub-module, and an LS channel estimated value $\hat{H}_{LS}$ is obtained by formula (1) in Instance I, and the dimension is P×R, that is, 2×2. Then $\hat{H}_{LS}$ and $Y_{Data}$ are inputted into the neural network based MIMO signal detector to obtain the final estimated value $\hat{X}_{Data}$ of the transmitted data. The LS channel estimation sub-module may be constructed by the method in related art, and the neural network based MIMO signal detector adopts a convolutional neural network (CNN).

Step 2: the training input of the convolutional neural network MIMO signal detector is constructed. In a similar way as in Instance I, the real part and the imaginary part of $\hat{H}_{LS}$ and $Y_{Data}$ are separated to form a group of real number arrays in the dimension of 120×12 and arranged in order. Since $\hat{H}_{LS}$ has values on P=2 antenna ports and R=2 reception antennas and $Y_{Data}$ has values on R=2 reception antennas in MIMO system, if the MIMO signal occupies 10 resource blocks (each resource block has 12 subcarriers), that is, NRB=10, 120 subcarriers are occupied in total, the dimension of this real number array is 120×12, and this real number array is used as the training input of the convolutional neural network.

Step 3: after the labels of the training samples of the MIMO signal detector are generated, model training is performed. The transmission end generates a transmitted modulated signal $X_{Data}$ (including two layers of MIMO signals). The pilot signal $Y_{Pilot}$, the received signal $Y_{Data}$ and the local pilot signal $X_{Pilot}$ are obtained at the reception end after passing through the wireless fading channel. The real number array is obtained as a training sample according to the similar operation in step 2.

In addition, the transmitted modulated signals $X_{Data}$ are arranged in order according to the real part and imaginary part, and modulated signals of a first layer are arranged at first, and then modulated signals of a second layer are arranged. The one-dimensional real number array is formed finally as shown below:

$$X'_{Data} = [X_{Data,0}^{Real}, X_{Data,0}^{Imag}, \ldots, X_{Data,i}^{Real}, X_{Data,i}^{Imag}, \ldots, X_{Data,K}^{Real}, X_{Data,K}^{Imag}];$$

Where $K=T \cdot L_{layer}$, $L_{layer}=2$ denotes the number of layers of MIMO signal, and T=120 denotes the number of RE occupied by each layer modulated signals of the MIMO signal. Then the dimension of this one-dimensional real number array $X'_{Data}$ is 1×480, and is used as the label of the training sample. In different fading channels, a plurality of groups of training samples and labels are generated and inputted into CNN for training to obtain the estimated value $X_{Data}$ of the transmitted signal. Then the MSE loss function is computed with the estimated value of the transmitted signal and the label $X'_{Data}$, and is shown in the following formula (3):

$$\mathrm{loss}(X'_{Data}, \hat{X}_{Data}) = \frac{1}{n}\sum_{i=0}^{n}(X'_{Data,i} - \hat{X}_{Data,i})^2 \quad (3)$$

Where, n denotes the number of batch size samples for training each time. During model training, an Adam optimizer is used to train CNN based on the MSE loss function. When the loss function converges to a certain degree, network training is completed. In this case, model parameters are saved for subsequent online signal detection.

Step 4: online MIMO signal detection is implemented. After CNN training, the CNN may be deployed at the reception end of the OFDM system for online signal detection. During online signal detection, similarly, according to the processing flow in step 1 and step 2, the input parameters of the CNN are obtained at first and then online detection is performed, such that the output of the CNN, that is, the estimated value of the transmitted signal, may be obtained. The estimated value of the transmitted signal includes a corresponding real number array, and then conversion from the real number array to equalized complex number value data is completed, and is shown in an operation below:

$$\hat{X}_{Data} = [X^{Real}_{Data,0}, X^{Imag}_{Data,0}, \ldots, X^{Real}_{Data,i}, X^{Imag}_{Data,i}, \ldots, X^{Real}_{Data,K}, X^{Imag}_{Data,K}] \rightarrow \hat{X}^{sym}_{Data} = [\mathrm{complex}(X^{Real}_{Data,0}, X^{Imag}_{Data,0}), \ldots, \mathrm{complex}(X^{Real}_{Data,i}, X^{Imag}_{Data,i}), \ldots, \mathrm{complex}(X^{Real}_{Data,K}, X^{Imag}_{Data,K})]$$

Where, complex(•) denotes the operation of constituting one piece of complex number value data, and the complex number value data $$\hat{X}^{sym}_{Data}$$

converted are used for subsequent demodulation and decoding, so as to obtain the final output signal.

It can be seen that the output of the signal detection method in the example of the disclosure is equalized data after demodulated layer mapping, the modulated signal at the transmission end is used as the training label, and the MSE is used as the loss function. Thus, the estimated value continuously approaches the transmitted signal, and data bitstreams with different lengths and different modulation methods can be flexibly supported, and desirable universality is achieved.

Figure 14:
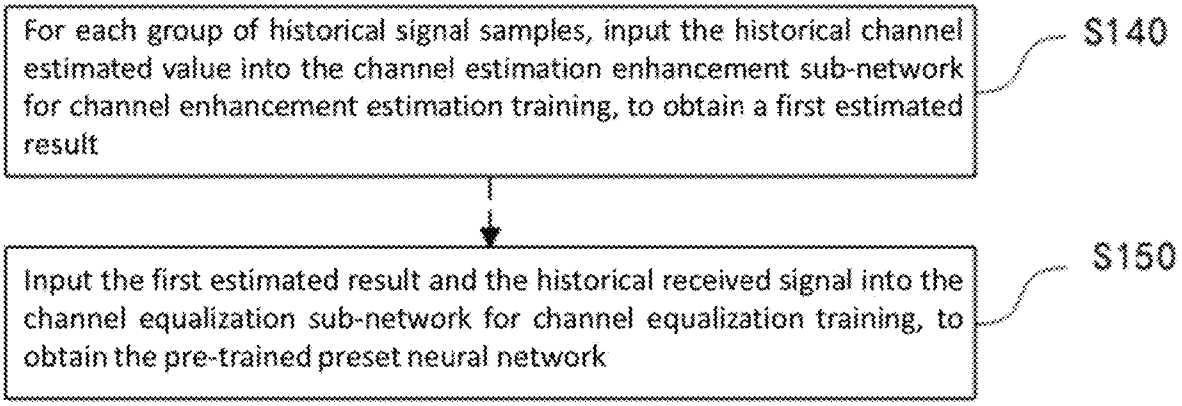
FIG. 14 is a flowchart of a signal detection method before a current channel estimated value and a received signal to be detected are inputted into a pre-trained preset neural network for signal detection according to another example of the disclosure.

As shown in FIG. 14, in an example of the disclosure, in a case that a plurality of groups of historical signal samples are provided, and the preset neural network includes a channel estimation enhancement sub-network and a channel equalization sub-network, the signal detection method further includes, but is not limited to, S140 to S150 before S120.

In S140: for each group of historical signal samples, the historical channel estimated value is inputted into the channel estimation enhancement sub-network for channel enhancement estimation training, to obtain a first estimated result.

In S150: the first estimated result and the historical received signal is inputted into the channel equalization sub-network for channel equalization training, to obtain the pre-trained preset neural network.

In these steps, the preset neural network includes the channel estimation enhancement sub-network and the channel equalization sub-network, and each sub-network has a separate performance. The first estimated result is obtained by inputting the historical channel estimated value of each group of historical signal samples into the channel estimation enhancement sub-network for channel enhancement estimation training. Then the pre-trained preset neural network is obtained by inputting the first estimated result and the historical received signal into the channel equalization sub-network for channel equalization training. Compared with a preset neural network with integrated functions, the same effective and reliable training effect can be achieved.

In an example, the channel estimation enhancement sub-network and the channel equalization sub-network may be trained together, or separately. Alternatively, those skilled in the art may also select a corresponding training method to train the channel estimation enhancement sub-network and the channel equalization sub-network according to the specific application scenario, which is not limited herein.

Figure 15:
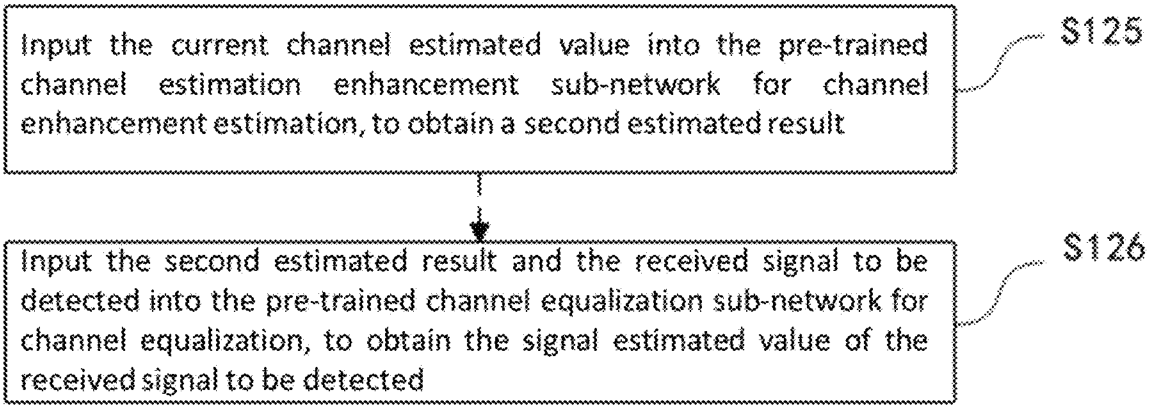
FIG. 15 is a flowchart of obtaining a signal estimated value of a received signal to be detected in a signal detection method according to another example of the disclosure.

As shown in FIG. 15, in an example of the disclosure, S120 includes, but is not limited to, S125 to S126.

In S125: the current channel estimated value is inputted into the pre-trained channel estimation enhancement sub-network for channel enhancement estimation, to obtain a second estimated result.

In S126: the second estimated result and the received signal to be detected are inputted into the pre-trained channel equalization sub-network for channel equalization, to obtain the signal estimated value of the received signal to be detected.

In these steps, when signal detection is needed, the second estimated result is directly obtained by inputting the current channel estimated value into the pre-trained channel estimation enhancement sub-network for channel enhancement estimation. Then, the signal estimated value of the received signal to be detected may be obtained by inputting the second estimated result and the received signal to be detected into the pre-trained channel equalization sub-network for channel equalization. By testing and computing the channel estimated result and the final signal estimated value respectively, the signal detection accuracy of the preset neural network can be improved.

It should be noted that the working principles of S140 to S150 and S125 to S126 are similar to the related steps in the previous example, except for the difference that the preset neural network in the previous example has an integrated structure, while the preset neural network in the disclosure is divided into two sub-networks, and the function of the single preset neural network may be completely implemented through cooperation of the two sub-networks. Since the detailed principles and flows of the preset neural network have been described in detail in the previous example, reference can be made to the detailed principles and flows of the preset neural network in the previous example for step examples of this example, which will not be repeated herein for avoiding redundancy.

The working principles of the examples described above will be described below with another entire flow instance below.

Figure 16:
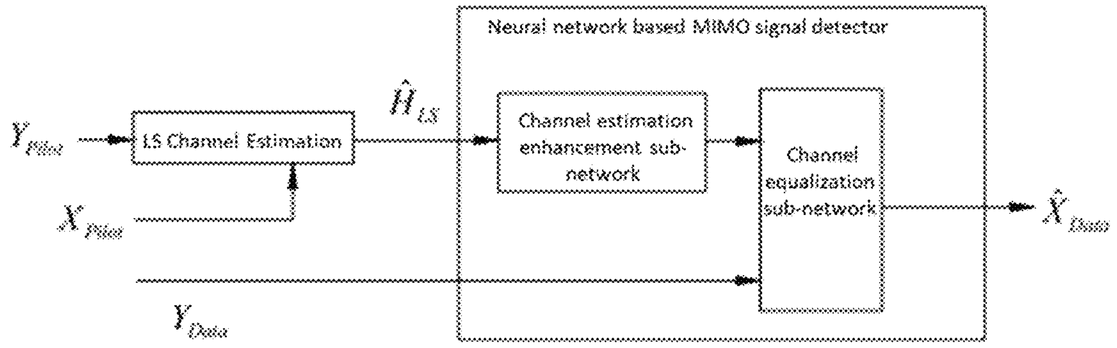
FIG. 16 is a schematic diagram of a principle of an orthogonal frequency division multiplexing (OFDM) system based on a preset neural network according to an example of the disclosure.

Instance V:

As shown in FIG. 16, in an OFDM system with the MIMO technology, a neural network (that is, the preset neural network in the example of the disclosure) based MIMO signal detector and an LS channel estimation module are provided. In this case, L=4 data layers, P=4 antenna ports, T=4 physical transmitting antennas, and R=4 physical reception antennas are provided. A frequency domain signal Y at the reception end may be expressed as formula (4):

$$Y = HX + N \rightarrow \begin{bmatrix} y_1 \\ y_2 \\ y_3 \\ y_4 \end{bmatrix} = \begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix} \cdot \begin{bmatrix} x_1 \\ x_2 \\ x_3 \\ x_4 \end{bmatrix} + \begin{bmatrix} n_1 \\ n_2 \\ n_3 \\ n_4 \end{bmatrix} \quad (4)$$

Where, X denotes a transmitted signal of these four data layers after modulation, and the dimension is L×1, that is, 4×1; H denotes a radio channel matrix between the transmission end and the reception end, and the dimension is T×R, that is, 4×4; and N denotes additive white Gaussian noise, and the dimension is R×1, that is, 4×1. The dimensions of the frequency domain received signal $Y_{Data}$ and the received pilot signal $Y_{Pilot}$ are also R×1, that is, 4×1, and the dimension of the local pilot signal $X_{Pilot}$ at the reception end is P×1, that is, 4×1. Assuming that the frequency domain received signal and the received pilot signal occupy four OFDM symbols, the received pilot signal occupies the first OFDM symbol and the frequency domain received signal occupies the remaining three OFDM symbols.

The MIMO signal detection method based on the neural network proposed in this instance focuses on how to detect the transmitted signal X from the frequency domain signal Y at the reception end. The specific steps are as follows:

Step 1: the structure of the neural network based MIMO signal detector is determined. At first, $X_{Pilot}$ and $Y_{Pilot}$ are inputted into an LS channel estimation sub-module, and an LS channel estimated value $\hat{H}_{LS}$ is obtained by formula (1) in Instance I, and the dimension is P×R, that is, 4×4. Then $\hat{H}_{LS}$ and $Y_{Data}$ are inputted into the neural network based MIMO signal detector to obtain the final estimated value $\hat{X}_{Data}$ of the transmitted data. The LS channel estimation sub-module may be constructed by the method in related art, and the neural network based MIMO signal detector includes two sub-networks: the channel estimation enhancement sub-network that is used for channel estimation enhancement and removing noise and interference and improving a quality of channel estimation; and a channel equalization sub-network that is used for channel equalization and MIMO signal detection. These two sub-networks adopt residual neural networks that each have a channel attention mechanism.

Step 2: a training input of the channel estimation enhancement sub-network is constructed. In a similar way as in Instance I, the real part and the imaginary part of $\hat{H}_{LS}$ are separated to form a group of real number arrays in the dimension of 240×32 and arranged in order. In the MIMO system, $\hat{H}_{LS}$ has values on P=4 antenna ports and R=4 reception antennas, and $Y_{Data}$ has values on R=4 reception antennas. If the MIMO signal occupies 20 resource blocks (each resource block has 12 subcarriers), that is, NRB=20, 240 subcarriers are occupied in total, and a pilot occupies an OFDM symbol. Thus, the dimension of this real number array is 240×32, and this real number array $H'_{LS}$ is used as the training input of the channel estimation enhancement sub-network. And $H'_{LS}$ is inputted into the channel estimation enhancement sub-network, an output H" is obtained through a residual neural network, and a dimension is 240×32.

Then, a training input into the channel equalization sub-network is constructed, and the real part and the imaginary part of H" and $Y_{Data}$ are separated to form a group of real number arrays that are arranged in the following order with a dimension of 240×56:

$$\begin{aligned}[&\mathrm{Re}(H''^{P=1}_{R=1}), \mathrm{Im}(H''^{P=1}_{R=1}), \ldots, \mathrm{Re}(H''^{P=1}_{R=4}), \mathrm{Im}(H''^{P=1}_{R=4}), \\ &\ldots, \mathrm{Re}(H''^{P=4}_{R=1}), \mathrm{Im}(H''^{P=4}_{R=1}), \ldots, \mathrm{Re}(H''^{P=4}_{R=4}), \mathrm{Im}(H''^{P=4}_{R=4}), \\ &\mathrm{Re}(Y^{R=1}_{Data,sym=2}), \mathrm{Im}(Y^{R=1}_{Data,sym=2}), \ldots, \mathrm{Re}(Y^{R=4}_{Data,sym=4}), \mathrm{Im}(Y^{R=4}_{Data,sym=4})]\end{aligned}$$

Where, $Y_{Data}$ occupies three OFDM symbols, and the dimension of $Y_{Data}$ is 240*24. Then, this real number array with the dimension of 240×56 is used as the training input into the channel equalization sub-network.

Step 3: after the labels of the training samples of the MIMO signal detector are generated, model training is performed. The transmission end generates a transmitted modulated signal $X_{Data}$ (including four layers of MIMO signals on three OFDM symbols). The pilot signal $Y_{Pilot}$, the received signal $Y_{Data}$ and the local pilot signal $X_{Pilot}$ are obtained at the reception end after passing through the wireless fading channel. The training samples for the channel estimation enhancement sub-network and the channel equalization sub-network are obtained according to the similar operation in step 2.

In addition, the transmitted modulated signals $X_{Data}$ are arranged in order according to the real part and imaginary part, and modulated signals of a first layer are arranged at first, and then modulated signals of a second layer are arranged. The one-dimensional real number array is formed finally as shown below:

$$X'_{Data} = [X^{Real}_{Data,0}, X^{Imag}_{Data,0}, \ldots, X^{Real}_{Data,i}, X^{Imag}_{Data,i}, \ldots, X^{Real}_{Data,K}, X^{Imag}_{Data,K}];$$

Where, $K = T \cdot L_{layer}$, $L_{layer}=4$ denotes the number of layers of MIMO signal, and T=240*3 denotes the number of RE occupied by the modulated signals of each layer of the MIMO signal. Then the dimension of this one-dimensional real number array $$X'_{Data}$$

$X'_{Data}$ is 1×5760, and is used as the label of the training sample. In different fading channels, a plurality of groups of training samples and labels are generated and inputted into the channel estimation enhancement sub-network and the channel equalization sub-network for entire training, and the estimated value $\hat{X}_{Data}$ of the transmitted signal is obtained through output by the channel equalization sub-network. Then Euclidean distance as the loss function is computed with the estimated value of the transmitted signal and the label $$X'_{Data},$$

and is shown in the following formula (5):

$$\text{loss}(X'_{Data}, \hat{X}_{Data}) = \frac{1}{n}\sum_{i=0}^{n}\sqrt{\left(X'^{Real}_{Data,i} - \hat{X}^{Real}_{Data,i}\right)^2 + \left(X'^{Imag}_{Data,i} - \hat{X}^{Imag}_{Data,i}\right)^2} \quad (5)$$

Where, n denotes the number of batch size samples for training each time. During model training, an Adam optimizer is used to train the residual neural network based on the Euclidean distance loss function. When the loss function converges to a certain degree, network training is completed. In this case, model parameters are saved for subsequent online signal detection.

Step 4: online MIMO signal detection is implemented. After residual neural network training, the CNN may be deployed at the reception end of the OFDM system for online signal detection. During online signal detection, similarly, according to the processing flow in step 1 and step 2, the input parameters of the residual neural network are obtained at first and then online detection is performed, such that the output of the residual neural network, that is, the estimated value of the transmitted signal, may be obtained. The estimated value of the transmitted signal includes a corresponding real number array, and then conversion from the real number array to equalized complex number value data is completed, and is shown in an operation below:

$$\hat{X}_{Data} = \left[X^{Real}_{Data,0}, X^{Imag}_{Data,0}, \ldots, X^{Real}_{Data,i}, X^{Imag}_{Data,i}, \ldots, X^{Real}_{Data,K}, X^{Imag}_{Data,K}\right] \rightarrow \hat{X}^{sym}_{Data} = \left[\text{complex}\left(X^{Real}_{Data,0}, X^{Imag}_{Data,0}\right), \ldots, \text{complex}\left(X^{Real}_{Data,i}, X^{Imag}_{Data,i}\right), \ldots, \text{complex}\left(X^{Real}_{Data,K}, X^{Imag}_{Data,K}\right)\right]$$

Where, complex(•) denotes the operation of constituting one piece of complex number value data, and the complex number value data $$\hat{X}^{sym}_{Data}$$

converted are used for subsequent demodulation and decoding, so as to obtain the final output signal.

It can be seen that the output of the signal detection method in the example of the disclosure is equalized data after demodulated layer mapping, the modulated signal at the transmission end is used as the training label, and the residual neural network is used as the loss function. Thus, the estimated value continuously approaches the transmitted signal, and data bitstreams that have different lengths and different modulation methods can be flexibly supported, and desirable universality is achieved.

Figure 17:
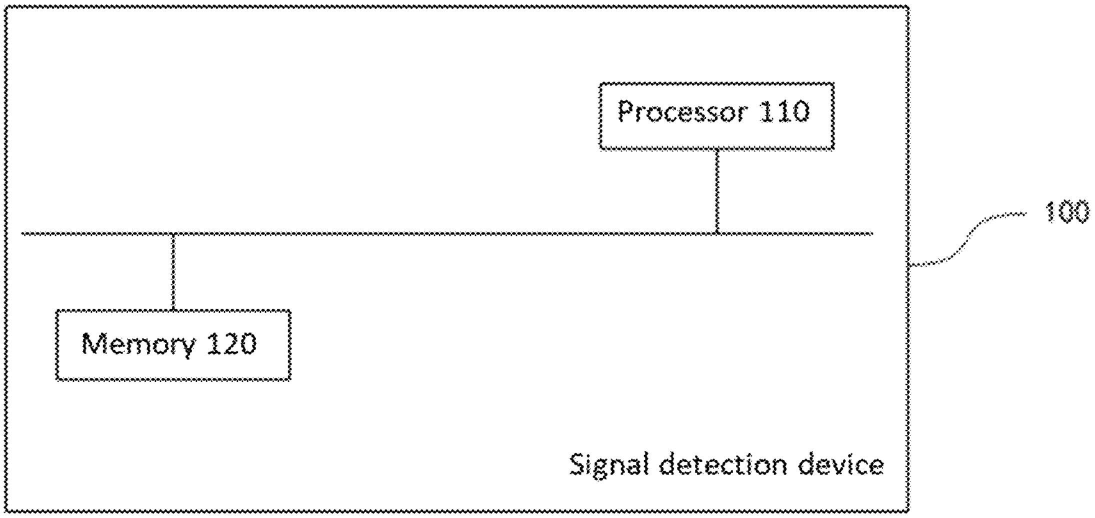
FIG. 17 is a schematic diagram of a signal detection device according to an example of the disclosure.

In addition, as shown in FIG. 17, an example of the disclosure further discloses a signal detection device 100. The signal detection device includes at least one processor 110; and at least one memory 120 for storing at least one program. The at least one program implement the signal detection method in any previous example when executed by the at least one processor 110.

In addition, an example of the disclosure further provides a computer-readable storage medium. The computer-readable storage medium stores a computer-executable instruction. The computer-executable instruction is configured to execute the signal detection method in any previous example.

In addition, an example of the disclosure further provides a computer program product. The computer program product includes a computer program or a computer instruction. The computer program or the computer instruction is stored in a computer-readable storage medium, a processor of a computer device reads the computer program or the computer instruction from the computer-readable storage medium, and the processor causes the computer device to execute the signal detection method in any previous example by executing the computer program or the computer instruction.

It can be understood by those skilled in the art that all or some of the steps and systems in the method disclosed above may be implemented as software, firmware, hardware and their appropriate combinations. Some physical components or all physical components may be implemented as software executed by the processor, such as a central processing unit, a digital signal processor or a microprocessor, or as hardware, or as an integrated circuit, such as an application-specific integrated circuit. Such software may be distributed on the computer-readable medium. The computer-readable medium may include a computer storage medium (or a non-transitory medium) and a communication medium (or a transitory medium). As well known to those skilled in the art, the term computer storage medium includes volatile, nonvolatile, removable and non-removable media implemented in any method or technology for storing information (such as a computer-readable instruction, a data structure, a program module or other data). The computer storage medium includes, but is not limited to, a random access memory (RAM), a read only memory (ROM), an electrically erasable programmable read-only memory (EEPROM), a flash memory or other memory technologies, a compact disc read-only memory (CD-ROM), a digital versatile disc (DVD) or other optical disk storages, magnetic cassettes, magnetic tapes, magnetic disk storages or other magnetic storage apparatuses, or any other medium that may be used to store desired information and may be accessed by computers. Furthermore, it is well known to those skilled in the art that the communication medium typically includes the computer-readable instruction, the data structure, the program module or other data in, for example, a carrier wave or a modulated data signal of other transmission mechanisms, and may include any information delivery medium.

The invention claimed is:

1. A signal detection method, comprising:

obtaining at least one group of historical signal samples, wherein the historical signal sample comprises a historical channel estimated value, a historical received signal and a historical modulated signal; and inputting, in a case that a current channel estimated value and a received signal to be detected are obtained, the current channel estimated value and the received signal to be detected into a pre-trained preset neural network for signal detection, to obtain a signal estimated value of the received signal to be detected, wherein the pre-trained preset neural network is obtained by training a preset neural network by means of at least one group of the historical signal samples;

a plurality of groups of historical signal samples are provided, and each wireless fading channel corresponds to a plurality of groups of the historical signal samples; and obtaining the at least one group of historical signal samples, comprises:

obtaining the historical modulated signal transmitted by a transmission end;

performing preset signal processing on the historical modulated signal in each wireless fading channel, to obtain a received pilot signal, a local pilot signal and a historical received signal at a reception end; and multiplying the received pilot signal by a conjugate of the local pilot signal, to obtain the historical channel estimated value.

2. The signal detection method according to claim 1, wherein the pre-trained preset neural network is obtained by training the preset neural network by means of at least one group of the historical signal samples on the basis of a following step:

for each group of historical signal samples, training the preset neural network by taking the historical channel estimated value and the historical received signal as a training sample and taking the historical modulated signal as a label of the training sample, to obtain the pre-trained preset neural network.

3. The signal detection method according to claim 1, wherein in a case that the preset neural network comprises a channel estimation enhancement sub-network and a channel equalization sub-network, the pre-trained preset neural network is obtained by training the preset neural network by means of at least one group of the historical signal samples on the basis of following steps:

for each group of historical signal samples, inputting the historical channel estimated value into the channel estimation enhancement sub-network for channel enhancement estimation training, to obtain a first estimated result; and inputting the first estimated result and the historical received signal into the channel equalization sub-network for channel equalization training, to obtain the pre-trained preset neural network.

4. The signal detection method according to claim 3, wherein inputting the current channel estimated value and the received signal to be detected into the pre-trained preset neural network for signal detection, to obtain the signal estimated value of the received signal to be detected, comprises:

inputting the current channel estimated value into the pre-trained channel estimation enhancement sub-network for channel enhancement estimation, to obtain a second estimated result; and inputting the second estimated result and the received signal to be detected into the pre-trained channel equalization sub-network for channel equalization, to obtain the signal estimated value of the received signal to be detected.

5. The signal detection method according to claim 2, wherein training the preset neural network by taking the historical channel estimated value and the historical received signal as the training sample and taking the historical modulated signal as the label of the training sample, comprises:

combining real parts and imaginary parts of the historical channel estimated value and the historical received signal that are obtained, to obtain a first real number array used as the training sample;

combining a real part and an imaginary part of the historical modulated signal that is obtained, to obtain a second real number array used as the label of the training sample; and inputting the first real number array and the second real number array into the preset neural network for training, to obtain the signal estimated value of the historical received signal.

6. The signal detection method according to claim 5, wherein combining real parts and imaginary parts of the historical channel estimated value and the historical received signal that are obtained, to obtain the first real number array used as the training sample, comprises:

obtaining a first real part and a first imaginary part of the historical channel estimated value, and obtaining a second real part and a second imaginary part of the historical received signal; and arranging and combining the first real part, the first imaginary part, the second real part and the second imaginary part in preset order, to obtain the first real number array used as the training sample.

7. The signal detection method according to claim 5, wherein the historical modulated signal comprises a modulated signal layer, the modulated signal layer comprises a plurality of layer modulated signals, and combining the real part and the imaginary part of the historical modulated signal that is obtained, to obtain the second real number array used as the label of the training sample, comprises:

obtaining real parts and imaginary parts of the layer modulated signals; and arranging and combining the real parts and imaginary parts of the layer modulated signals in preset order, to obtain the second real number array as the label of the training sample.

8. The signal detection method according to claim 5, wherein after obtaining the signal estimated value of the historical received signal, determining that the pre-trained preset neural network is obtained on the basis of following steps:

obtaining a current numerical value of a preset loss function that corresponds to the preset neural network according to the signal estimated value of the historical received signal and the second real number array; and determining, in a case that the current numerical value of the preset loss function satisfies a preset convergence condition, that the pre-trained preset neural network is obtained.

9. The signal detection method according to claim 8, wherein the preset loss function comprises at least one of the following:

a mean square error called MSE loss function;

a root mean squared error called RMSE loss function;

a mean absolute error called MAE loss function;

a Euclidean distance loss function;

a cosine distance loss function; and a linear weighting function of a MSE loss function, a RMSE loss function, a MAE loss function, a Euclidean distance loss function and a cosine distance loss function.

10. The signal detection method according to claim 1, wherein inputting the current channel estimated value and the received signal to be detected into the pre-trained preset neural network for signal detection, to obtain the signal estimated value of the received signal to be detected, comprises:

combining real parts and imaginary parts of the current channel estimated value and the received signal to be detected that are obtained, to obtain a third real number array; and inputting the third real number array into the pre-trained preset neural network for signal detection, to obtain a real number signal estimated result of the received signal to be detected.

11. The signal detection method according to claim 10, wherein combining the real parts and imaginary parts of the current channel estimated value and the received signal to be detected that are obtained, to obtain the third real number array, comprises:

obtaining a third real part and a third imaginary part of the current channel estimated value, and obtaining a fourth real part and a fourth imaginary part of the received signal to be detected; and arranging and combining the third real part, the third imaginary part, the fourth real part and the fourth imaginary part in preset order, to obtain the third real number array.

12. The signal detection method according to claim 10, wherein after obtaining the real number signal estimated result of the received signal to be detected, the method further comprises:

performing complex number conversion on the real number signal estimated result of the received signal to be detected, to obtain a complex number signal estimated result of the received signal to be detected; and demodulating and decoding the complex number signal estimated result, to obtain an output signal.

13. The signal detection method according to claim 12, wherein the real number signal estimated result comprises a real number signal estimated array, and the real number signal estimated array comprises real parts and imaginary parts of a plurality of layer signals that are arranged in order; and performing complex number conversion on the real number signal estimated result of the received signal to be detected, to obtain the complex number signal estimated result of the received signal to be detected, comprises:

performing complex number conversion on the real parts and the imaginary parts of the layer signals in the real number signal estimated array respectively, to obtain complex number conversion data corresponding to the layer signals; and arranging and combining the complex number conversion data in preset order, to obtain the complex number signal estimated result of the received signal to be detected.

14. The signal detection method according to claim 1, wherein multiplying the received pilot signal by the conjugate of the local pilot signal, to obtain the historical channel estimated value, comprises:

multiplying the received pilot signal by the conjugate of the local pilot signal by using a least squares called LS channel estimation algorithm, to obtain the historical channel estimated value.

15. The signal detection method according to claim 1, wherein obtaining the historical modulated signal transmitted by the transmission end, comprises:

obtaining at least one group of transmission bit stream signals that are transmitted by the transmission end; and encoding and modulating at least one group of the transmission bit stream signals, to obtain the historical modulated signal.

16. The signal detection method according to claim 1, wherein the preset neural network comprises at least one of the following:

a deep neural network;

a convolutional neural network;

a residual convolutional neural network; and a residual convolutional neural network with an attention mechanism.

17. A signal detection device, comprising:

at least one processor; and at least one memory configured to store at least one program; wherein the at least one program, when executed by the at least one processor, implements the signal detection method according to claim 1.

18. A non-transitory computer-readable storage medium, storing a processor-executable program, wherein the processor-executable program, when executed by a processor, is configured to implement the signal detection method according to claim 1.

19. A non-transitory computer program product, comprising a computer program or a computer instruction, wherein the computer program or the computer instruction is stored in a computer-readable storage medium, a processor of a computer device reads the computer program or the computer instruction from the computer-readable storage medium, and the processor executes the computer program or the computer instruction, to enable the computer device to execute the signal detection method according to claim 1.

* * * * *